(12) United States Patent
Mizushima et al.

(10) Patent No.: US 6,975,804 B2
(45) Date of Patent: Dec. 13, 2005

(54) OPTICAL FIBER FIXING DEVICE WITH FIXING MEMBER SPEED CONTROLLER AND RELATED METHOD

(75) Inventors: Toshiro Mizushima, Yamaga (JP); Kenji Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/769,771

(22) Filed: Feb. 3, 2004

(65) Prior Publication Data

US 2004/0156612 A1  Aug. 12, 2004

(30) Foreign Application Priority Data

Feb. 4, 2003 (JP) ............................ P2003-027008

(51) Int. Cl.[7] .............................................. G02B 6/00
(52) U.S. Cl. ...................................... 385/137; 385/147
(58) Field of Search ........................... 385/137, 76, 53, 385/92, 147

(56) References Cited

U.S. PATENT DOCUMENTS

| 3,902,784 | A | * | 9/1975 | Dakss et al. ................... 385/76 |
| 3,999,841 | A | * | 12/1976 | Dakss et al. ................... 385/53 |
| 5,170,456 | A | * | 12/1992 | Itoh et al. ...................... 385/96 |
| 5,412,748 | A | * | 5/1995 | Furuyama et al. ............. 385/92 |
| 5,784,509 | A | * | 7/1998 | Yamane et al. ................ 385/49 |
| 6,325,883 | B1 | * | 12/2001 | Backer et al. ............ 156/275.5 |
| 6,368,441 | B1 | * | 4/2002 | Yamada ...................... 156/178 |
| 6,778,754 | B1 | * | 8/2004 | Hirayama et al. ........... 385/147 |
| 6,788,950 | B1 | * | 9/2004 | Raissinia et al. ............ 455/522 |
| 2003/0077034 | A1 | * | 4/2003 | Chiba et al. ................... 385/31 |

FOREIGN PATENT DOCUMENTS

JP        10-39161       2/1998

* cited by examiner

*Primary Examiner*—Chandrika Prasad
(74) *Attorney, Agent, or Firm*—Sughrue Mion, PLLC

(57) ABSTRACT

An optical fiber fixing device has a V-grooved block, a clamp mechanism, a stopper mechanism, a sensor, a motor, an operator section and a controller. The V-grooved block has a top surface formed with a V-groove to support an optical fiber thereon. The clamp mechanism has a clamp portion to fix the optical fiber on the V-grooved block. The stopper mechanism retains the clamp mechanism before the clamp portion is brought into contact with the optical fiber. The sensor outputs a detection signal to the controller upon detection of the clamp mechanism being brought into contact with the stopper mechanism. Upon receipt of that signal, the controller drives the motor to lower the stopper mechanism. In sequential operation with downward movement of the stopper mechanism, the clamp portion presses the optical fiber against the V-groove to fix the optical fiber in place between the clamp portion and the V-grooved block.

38 Claims, 5 Drawing Sheets

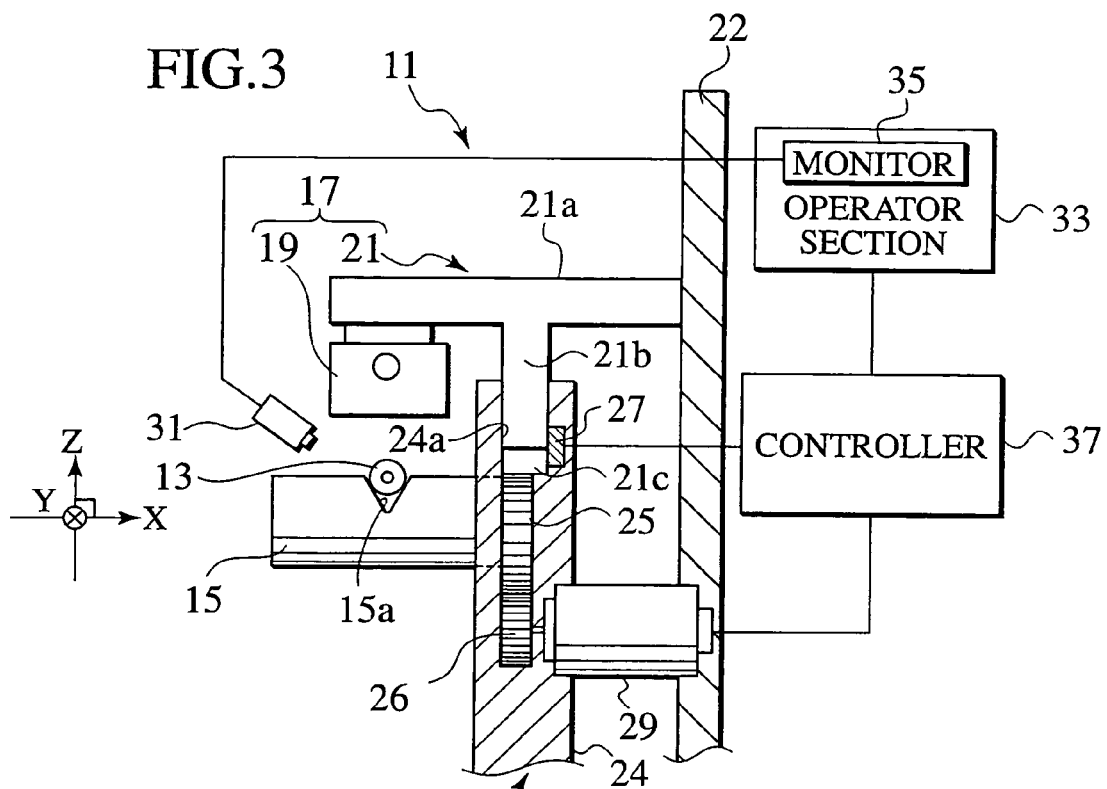
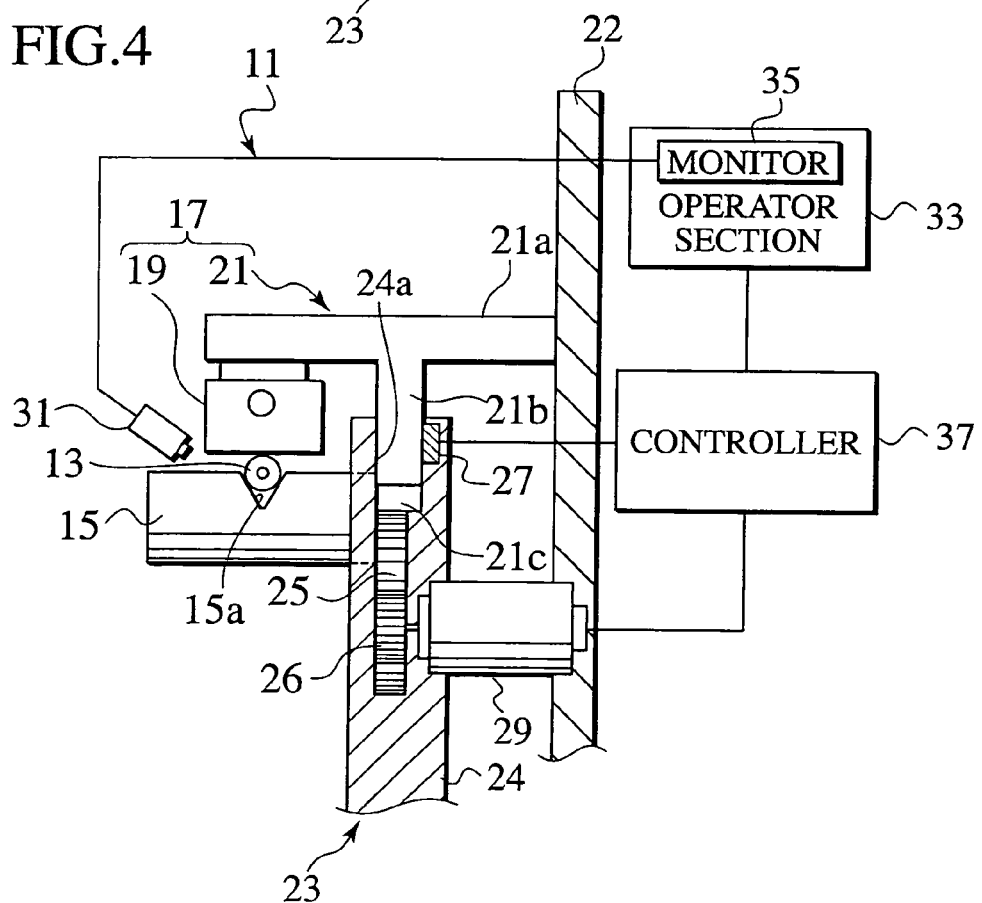

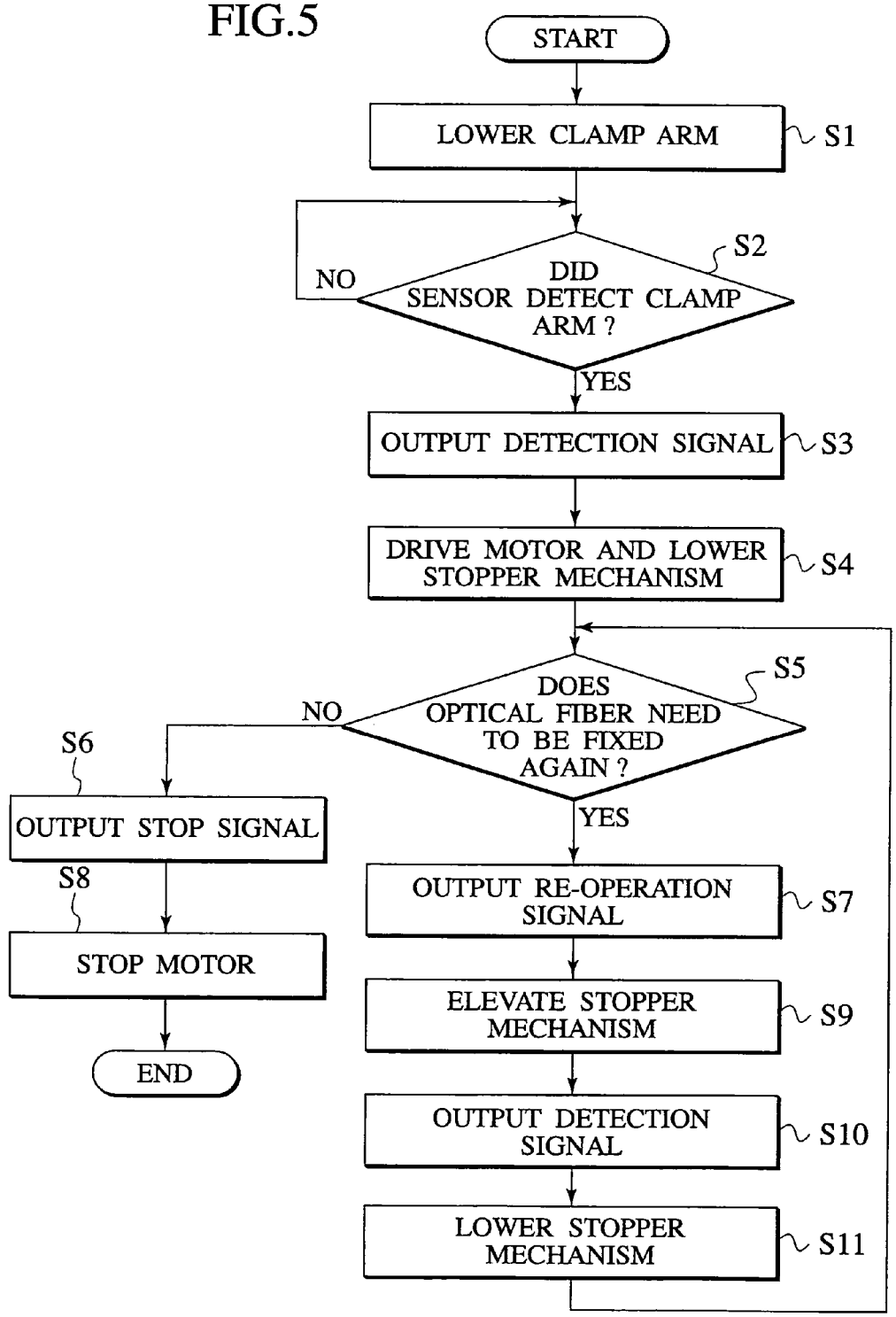

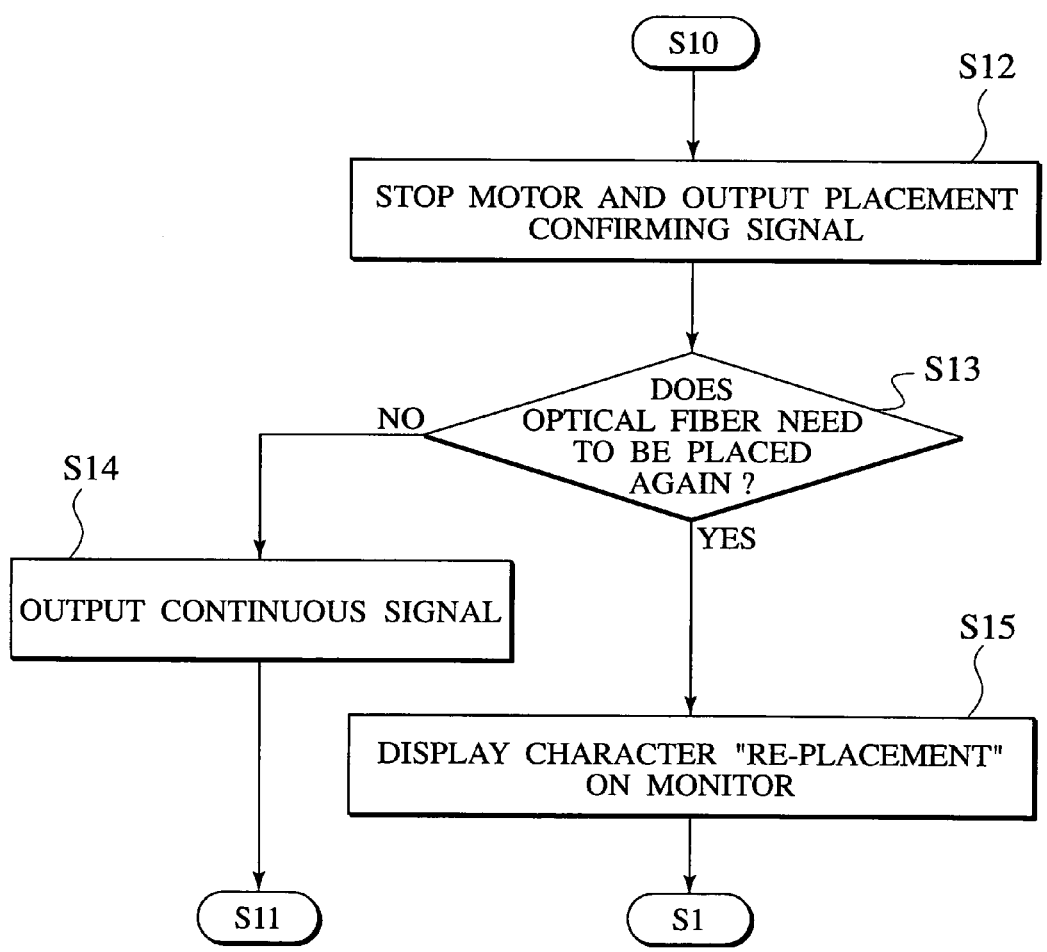

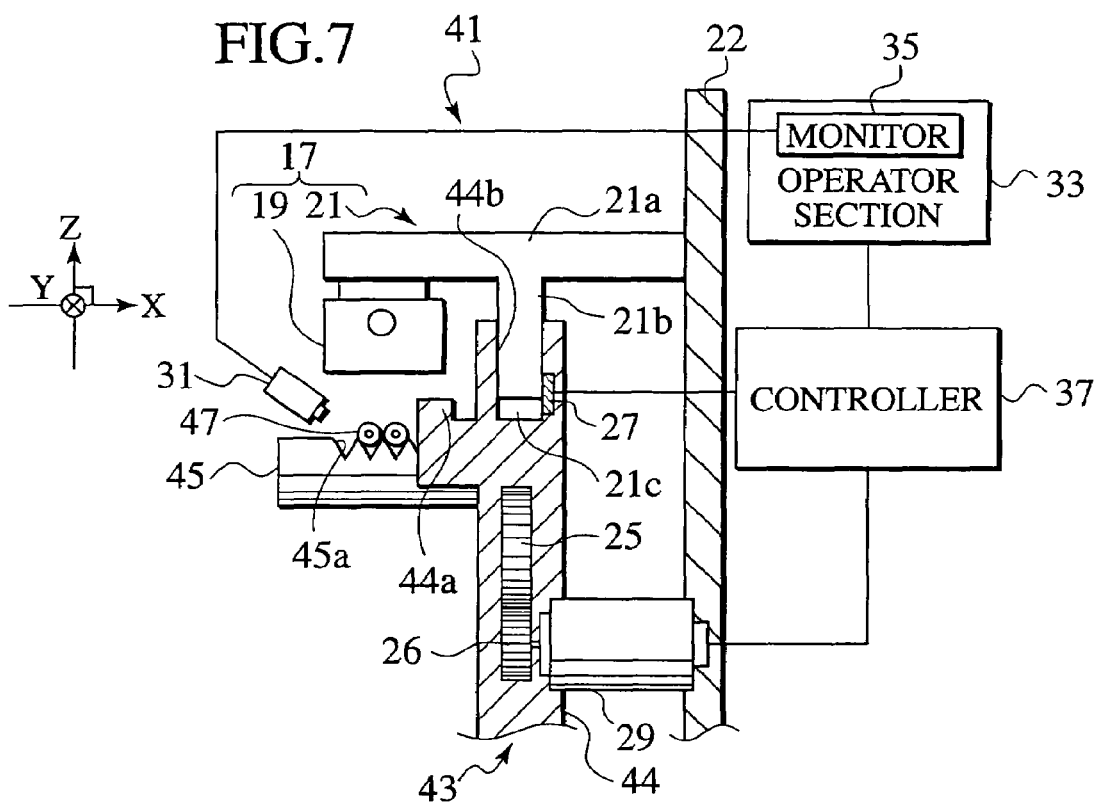
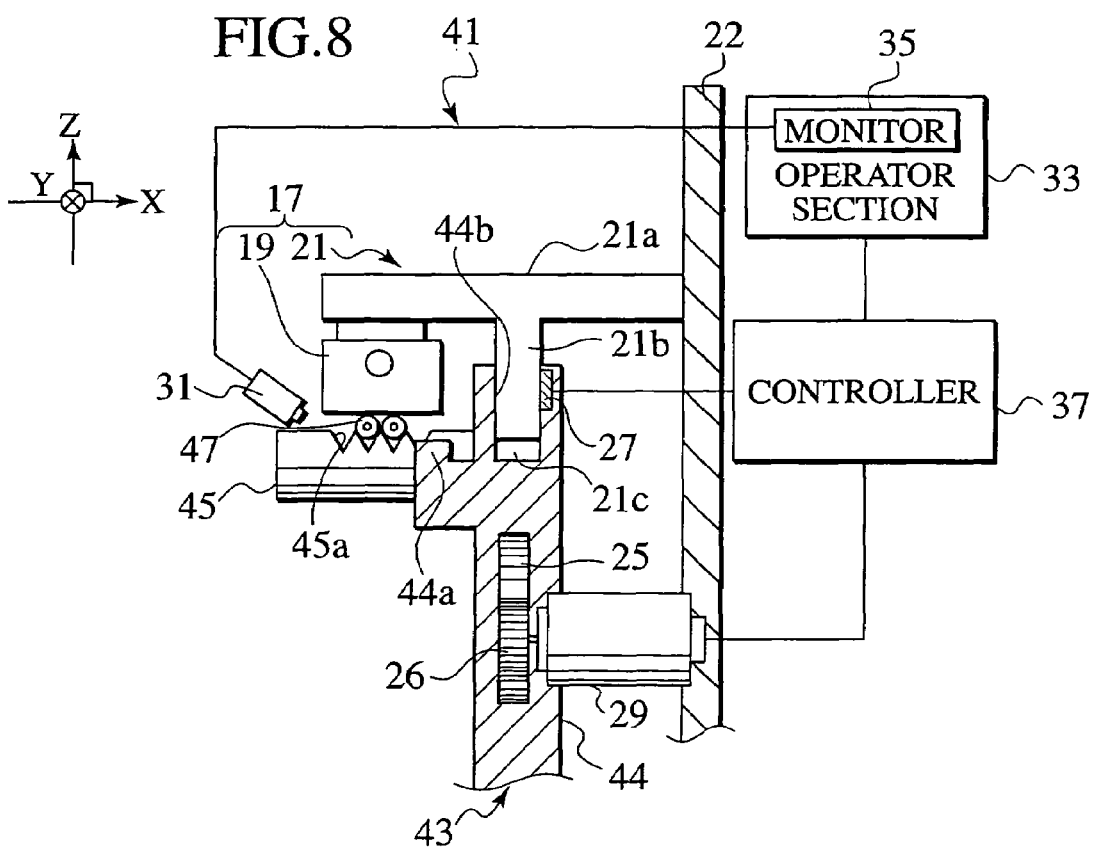

OPTICAL FIBER FIXING DEVICE WITH FIXING MEMBER SPEED CONTROLLER AND RELATED METHOD

CROSS-REFERENCE TO RELATED APPLICATIONS

This application claims the benefit of Japanese Patent Application No. 2003-27008, filed on Feb. 4, 2003 in the Japanese Patent Office, the disclosure of which is incorporated herein by reference.

BACKGROUND OF THE INVENTION

1. Field of the Invention

The present invention relates to an optical fiber fixing device and a related method for fixing an optical fiber on a V-grooved block in an optical fiber fusion splicing apparatus.

2. Description of the Related Art

An optical fiber fixing device is disclosed in Japanese Patent Publication No. 10-39161 and reproduced herein in FIGS. 1 and 2. As shown in FIG. 1, an optical fiber fixing device 101 is comprised of a main frame 103, a lid 105, a V-grooved block 107, a stepping motor 109, a presser block 111, a support table 113, a link mechanism 115, a tension spring 117 and an actuator 119. The V-grooved block 107, the stepping motor 109 and the actuator 119 are disposed on a main frame 103 side. The presser block 111, the support table 113, the link mechanism 115 and the tension spring 117 are disposed on the lid 105 side.

The presser block 111 is mounted to a lower end of the support table 113. The support table 113 is pulled upward at all times due to a resilient force of the tension spring 117 and is vertically moved via the link mechanism 115 by the stepping motor 109. The link and is vertically moved via the link mechanism 115 by the stepping motor 109. The link mechanism 115 is supported on the lid 105 to rotate around a fulcrum S. The tension spring 117 has one end coupled to the lid 105 and the other end coupled to the support table 113.

Under such a construction, as shown in FIG. 2, an optical fiber 121 is fixed in place between the V-grooved block 107 and the presser block 111. After the lid 105 has been closed toward the main frame 103, the link mechanism 115 is driven by the stepping motor 109 to allow one end of the link mechanism 115 to be pushed upward. This causes the other end of the link mechanism 115 to be lowered, thereby compelling the support table 113 and the presser block 111 to be pushed downward. When this takes place, the V-grooved block 107 is driven by the actuator 119 to be pushed upward. Since the optical fiber 121 is pressed downward by the presser block 111 and pushed upward by the V-grooved block 107, the optical fiber fixing device 101 fixes the optical fiber 121 in place between the V-grooved block 107 and the presser block 111.

However, this fixing mechanism has several drawbacks. For example, due to the use of such a complex fixing mechanism, manufacturing costs and maintenance costs increase. The optical fixing device 101 uses, as the fixing mechanism, the V-grooved block 107, the stepping motor 109, the link mechanism 115, the tension spring 117 and the actuator 119. Accordingly, the manufacturing cost and the maintenance cost of the optical fiber fixing device 101 increase.

Further, due to the use of the spring as one part of the fixing mechanism, unevenness occurs in the force required for pressing the optical fiber onto a V-grooved block. The optical fiber fixing device 101 urges the support table 113 upward at all times using the tension spring 117. Since the resilient force of the spring normally varies depending on its age (i.e., the amount of times it has been used) and the ambient temperature, etc., a force required for the link mechanism 115 to push the support table 113 downward differs in every fixing operation. Consequently, unevenness occurs in the force required for pressing the optical fiber 121 onto the V-grooved block 107.

Still further, due to the absence of a mechanism for controlling the moving speed of the fixing member, the optical fiber is not fixed in place between a fixing member (presser block) and a V-grooved block by taking a thickness of the optical fiber into consideration. In general, the thicker the optical fiber is (i.e., the larger the number of core wires of the optical fiber), the stronger repulsion force the optical fiber has, wherein the repulsion force is generated at the time of bringing the fixing member into contact with the optical fiber to push the fixing member upward. For this reason, in a case where the optical fiber is thick, if the fixing member is lowered at a low speed, the fixing member is pushed back in response to the repulsion force of the optical fiber before the fixing member pushes the optical fiber onto the V-grooved block 107. Accordingly, in the case where the optical fiber is thick, the fixing member needs to be lowered at a higher speed than that at which the fixing member is lowered when the optical fiber is thin.

Even further, due to the absence of a mechanism for automatically confirming a fixed status of the optical fiber, it takes much time to confirm such a status. When confirming the fixed status of the optical fiber 121, an operator needs to open the lid 105.

SUMMARY OF THE INVENTION

The present invention has been completed with the above in mind and has an object to provide an optical fiber fixing device and a related method that are able to easily move a fixing member in a desired direction and control the moving speed of the fixing member based on a fixed status of the optical fiber.

To achieve the above object, the present invention provides an optical fiber fixing device which allows an optical fiber, placed in a positioning groove, to be fixed, comprising a fixing member fixing the optical fiber in the positioning groove, a stopper section retaining the fixing member before the fixing member is brought into contact with the optical fiber, a driver section moving the fixing member in a desired one direction via the stopper section, and a controller controlling the driver section to adjust a moving speed of the fixing member.

According to the present invention, when attempting to move the fixing member closer to the optical fiber under a condition where the optical fiber is placed in the positioning groove, the fixing member is retained with the stopper member prior to being brought into contact with the optical fiber. The controller controls the driver section to adjust the moving speed of the fixing member via the stopper member, thereby permitting the fixing member to be moved in the desired one direction. Accordingly, the fixing member can be easily moved in the desired one direction and the moving speed of the fixing member can be controlled.

To achieve the above object, the present invention provides a method of fixing an optical fiber, placed in a positioning groove, using a fixing member, the method comprising the steps of moving the fixing member to the optical fiber under a condition where the optical fiber is placed in the positioning groove, retaining the fixing member using a stopper section before the fixing member is brought into contact with the optical fiber, and controlling a moving speed of the fixing member and fixing the optical fiber via the stopper section.

According to the present invention, when attempting to move the fixing member closer to the optical fiber under a condition where the optical fiber is placed in the positioning groove, the fixing member is retained with the stopper member prior to being brought into contact with the optical fiber. Then, the moving speed of the fixing member is controlled to fix the optical fiber in place via the stopper member. Accordingly, the fixing member can be easily moved in the desired one direction and the moving speed of the fixing member can be controlled.

BRIEF DESCRIPTION OF THE DRAWINGS

The above objects, features and advantages of the invention will become more apparent from the following detailed description of exemplary embodiments thereof, in conjunction with the accompanying drawings, in which:

FIG. 3 is a structural view of an optical fiber fixing device, remaining in a status prior to fixing an optical fiber, of a first exemplary embodiment according to the present invention.

FIG. 4 is a structural view of an optical fiber fixing device, remaining in a status subsequent to the optical fiber being fixed in place, of the first exemplary embodiment according to the present invention.

FIG. 5 is a flowchart showing a control method related to the first exemplary embodiment of the present invention.

FIG. 6 is a flowchart showing a modified form of the control method related to the first exemplary embodiment of the present invention.

FIG. 7 is a structural view of an optical fiber fixing device, remaining in a status prior to fixing an optical fiber, of a second exemplary embodiment according to the present invention.

FIG. 8 is a structural view of an optical fiber fixing device, remaining in a status subsequent to the optical fiber being fixed in place, of the second exemplary embodiment according to the present invention.

DETAILED DESCRIPTION OF EXEMPLARY EMBODIMENTS

Figure 1:
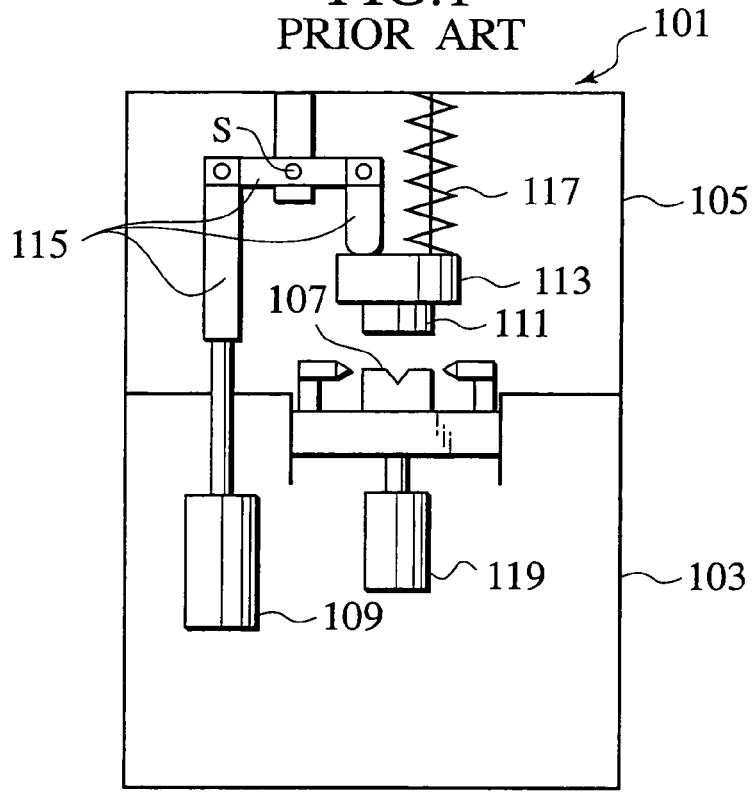
FIG. 1 is a cross sectional view of an optical fiber fixing device of the related art under a condition where a lid is closed.
Figure 2:
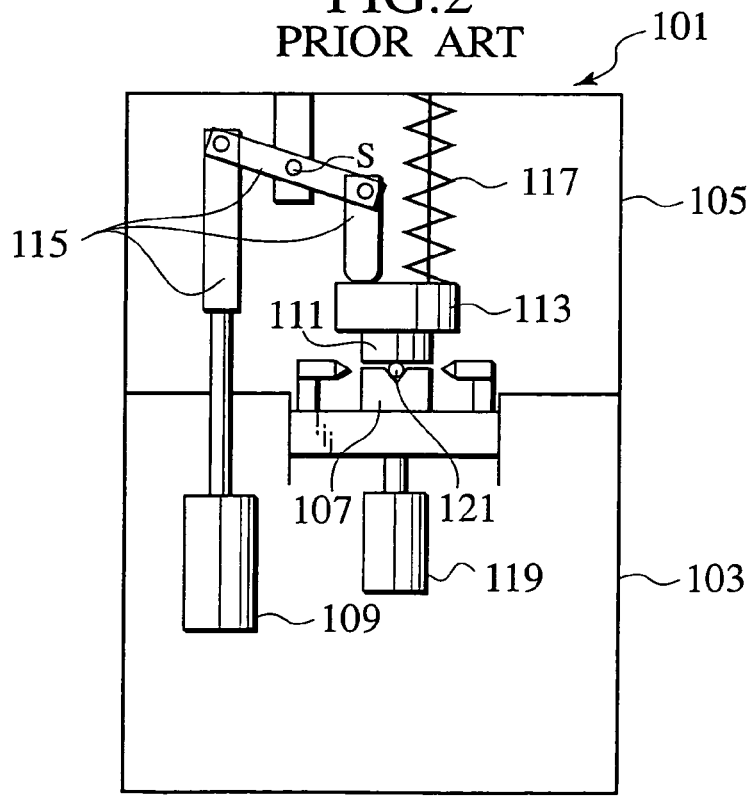
FIG. 2 is a cross sectional view of the optical fiber fixing device of the related art under a condition where an optical fiber remains in a fixed state.

Exemplary embodiments of the present invention will now be described with reference to FIGS. 3 to 8 of the accompanying drawings. The described exemplary embodiments are intended to assist the understanding of the invention, and are not intended to limit the scope of the invention in any way. In the figures, a lateral direction of a V-grooved block is assigned to an X-axis, a longitudinal direction is assigned to a Y-axis and a height direction is assigned to a Z-axis, with the X-, Y- and Z-axes intersecting with respect to one another.

First Exemplary Embodiment

An optical fiber fixing device of the first exemplary embodiment is mounted on a fusion splicing apparatus that allows two optical fibers to be fusion spliced. Before cut end faces of the two optical fibers are mutually abutted and then fusion spliced, the respective optical fibers are fixed on a V-grooved block by the optical fiber fixing device.

As shown in FIG. 3, the optical fiber fixing device 11 is comprised of the V-grooved block 15, a clamp mechanism 17, a direct acting mechanism 22, a stopper mechanism 23, a sensor 27, a motor 29, a TV camera 31, an operation section 33 and a controller 37.

The V-grooved block 15 has a V-groove 15a on a top surface thereof. An optical fiber 13 is placed on the V-groove 15a. The clamp mechanism (a fixing member) 17 serves to hold the optical fiber 13 on the V-grooved block 15 and is comprised of a clamp portion 19 and a clamp arm 21. The clamp portion 19 is disposed on a +Z side in opposition to the V-grooved block 15. The clamp portion 19 moves downward to be closer to the optical fiber 13 and finally presses the optical fiber 13 against the V-groove (a positioning groove) 15a. The clamp arm 21 is formed in a T-shape configuration that has a transfer portion 21a, an acting portion 21b and a magnet 21c. The transfer portion 21a is placed along the X-axis, and has one end connected to the clamp portion 19 and the other end connected to the direct acting mechanism 22. The acting portion 21b is placed along the Z-axis, and is integrally connected to a lower central portion of the transfer portion 21a. The magnet 21c is disposed on a lower end face of the acting portion 21b. The clamp arm 21 is guided by the direct acting mechanism 22 to be upwardly or downwardly moveable along the Z-axis. With the clamp arm 21 moving downward, the clamp portion 19 presses the optical fiber 13 against the V-groove 15a, thereby permitting the optical fiber 13 to be fixed on the V-grooved block 15. Also, in place of the direct acting mechanism 22, a rotary mechanism may be employed to rotate the clamp arm 21 to allow the optical fiber 13 to be fixed on the V-grooved block 15.

The stopper mechanism 23 includes a guide member 24 and a rack 25. The guide member 24 is located on a +X side of the V-grooved block 15 along the Z-axis. Formed on an upper area of the guide member 24 along the Y-axis is a groove portion 24a into which the acting portion 21b of the clamp arm 21 is inserted. The rack 25 is integrally formed on the guide member 24 along the Z-axis on a −Y side of the guide member 24.

The motor 29 is located on a −Y side of the stopper mechanism 23. A pinion gear 26 is fixedly secured to an output shaft of the motor 29. The pinion gear 26 is located on the −Y side of the stopper mechanism 23 along the Z-axis. With such a structure, the pinion gear 26 is in mesh with the rack 25. Accordingly, if the output shaft rotates in a clockwise direction or a counterclockwise direction based on a driving of the motor 29, the stopper mechanism 23 is moved upward or downward via the pinion gear 26. Also, at an initial position of the stopper mechanism 23, the pinion gear 26 meshes with the rack 25 at the lowest end thereof (see FIG. 3).

Upon sequential operation accompanied by action to close an upper opening of a body section (not shown) using a lid portion (not shown) of the optical fiber fixing device 11, the clamp arm 21 is guided by the direct acting mechanism 22 to move downward. Downward movement of the clamp arm 21 causes the acting portion 21b of the clamp arm 21 to be inserted into the groove portion 24a of the guide member 24. Under such a condition, the clamp portion 19 is positioned in an upper area over the V-grooved block 15 (see FIG. 3). Thereafter, if the motor 29 is driven to downwardly move the stopper mechanism 23, the clamp arm 21 progressively moves downward while causing the clamp portion 19 to press the optical fiber 13 against the groove 15a (see FIG. 4). This allows the optical fiber 13 to be fixed in place between the V-grooved block 15 and the clamp portion 19.

The sensor 27 includes a magnet sensor and, in an initial position of the stopper mechanism 23, is disposed in a position in close proximity to a bottom surface of the groove portion 24a of the guide member 24 on the −Y side of the guide member 24. The sensor 27 serves to determine whether the acting portion 21b of the clamp arm 21 is brought into contact with the bottom surface of the groove portion 24a of the guide member 24 or not. Due to the presence of the magnet 21c mounted to the lower end face of the acting portion 21b, if the acting portion 21b is moved closer to the bottom surface of the groove portion 24a of the guide member 24 at the initial position of the stopper mechanism 23, the sensor 27 detects the presence of the magnet 21c, thereby outputting a detection signal to the controller 37. Also, the sensor 27 may be disposed in any position provided that such a position is effective to allow the sensor 27 to determine whether the acting portion 21b of the clamp arm 21 is brought into contact with the bottom surface of the groove portion 24a of the guide member 24 or not. For instance, the sensor 27 may be disposed in an area close proximity to the bottom surface of the groove portion 24a of the guide member 24 on the +Y side of the guide member 24.

Disposed in an upper area of the V-grooved block 15 on the −X side of the V-grooved block 15 is the TV camera 31 that observes a fixed status of the optical fiber 13 placed on the V-groove 15a. The TV camera 31 is connected to the operator section 33 through a cable. The fixed status of the optical fiber 13 observed by the TV camera 31 is outputted to the operator section 33 and displayed over a monitor 35.

The operator section 33 executes image processing of image data outputted from the TV camera 31 and determines whether the optical fiber 13 is fixed with no gap between the clamp portion 19 and the V-grooved block 15 or not. Under a condition where the optical fiber 13 is pressed by the clamp portion 19, if the fixed status of the optical fiber 13 is favorable, the operator section 33 outputs a stop signal to the controller 37 whereas if the fixed status of the optical fiber 13 remains unfavorable, the operator section 33 outputs a re-operation signal to the controller 37.

The controller 37 is connected to the sensor 27, the operator section 33 and the motor 29 via the cable. The controller 37 controls start/stop of the motor 29, a rotational direction of the output shaft and a rotating speed of the output shaft based on the detection signal, the stop signal and the re-operation signal.

In the presently filed embodiment, if the output shaft of the motor 29 rotates in the clockwise direction as viewed on a −X side of the motor 29, the pinion gear 26 rotates in the clockwise direction as viewed on the −X side of the motor 29. This causes the stopper mechanism 23 to be shifted in a +Z direction (upward). Further, if the output shaft of the motor 29 rotates in the counterclockwise direction as viewed on the −X side of the motor 29, the pinion gear 26 rotates in the counterclockwise direction as viewed on the −X side of the motor 29. This causes the stopper mechanism 23 to be shifted in a −Z direction (downward).

FIG. 5 is a flowchart showing a method of controlling the optical fiber fixing device 11. Upon sequential operation accompanied by downward movement of the lid portion, the clamp arm 21 is guided by the direct acting mechanism 22 to move downward (step S1). The sensor 27 determines whether the acting portion 21b of the clamp arm 21 is brought into contact with the stopper mechanism 23 or not (Step S2). When the acting portion 21b of the clamp arm 21 is brought into contact with the stopper mechanism 23, the sensor 27 outputs the detection signal to the controller 37 (Step 3). Upon receipt of the detection signal, the controller 37 drives the motor 29 to move the stopper mechanism 23 downward (Step 4). When this takes place, the controller 37 operates to permit the output shaft of the motor 29 to rotate in the counterclockwise direction as viewed on the −X side of the motor 29 such that the stopper mechanism 23 is progressively moved downward via the pinion gear 26 and the rack 25. During downward movement of the stopper mechanism 23, the clamp arm 21 and the clamp portion 19 also move downward. Through downward movement of the clamp portion 19, the optical fiber 13 is pressed against the V-groove 15a.

The operator section 33 confirms the fixed status of the optical fiber 13 and determines whether the optical fiber 13 needs to be correctly fixed again or not (Step 5). In particular, the operator section 33 receives the fixed status of the optical fiber 13 as image data from the TV camera 31 at regular time intervals. Then, the operator section 33 carries out image processing of the received image data and determines whether the optical fiber 13 is fixed in place with no gap between the clamp portion 19 and the V-grooved block 15 or not. If it is determined that there is no need for correctly fixing the optical fiber again, the operator section 33 outputs the stop signal to the controller 37 (Step S6). If it is determined that there is a need for correctly fixing the optical fiber again, the operator section 33 outputs the re-operation signal to the controller 37 (Step S7). Upon receipt of the stop signal, the controller 37 interrupts the drive of the motor 29 (Step S8). Upon receipt of the re-operation signal, the controller 37 allows the stopper mechanism 23 to be lifted (Step S9). More particularly, the controller 37 operates to permit the output shaft of the motor 29 to rotate in the clockwise direction as viewed on the −X side of the motor 29 such that the stopper mechanism 23 is elevated via the pinion gear 26 and the rack 25. During upward movement of the stopper mechanism 23, the clamp arm 21 and the clamp portion 19 also move upward.

Upon returning to the initial position of the stopper mechanism 23, the sensor 27 detects the presence of the magnet 21c again and outputs the detection signal to the controller 37 (Step S10). Upon receipt of the detection signal, the controller 37 operates to compel the stopper mechanism 23 to move downward (Step S11). In particular, the controller 37 operates to permit the output shaft of the motor 29 to rotate in the counterclockwise direction as viewed on the −X side of the motor 29 such that the stopper mechanism 23 is lowered at a higher speed than that at which preceding operation is executed. Then, operation is routed back to step S5, and a similar cycle is repeatedly executed until the optical fiber 13 is correctly fixed in place with no gap between the clamp portion 19 and the V-grooved block 15.

An optical fiber fixing device 11 constructed according to the first exemplary embodiment has many advantageous features. For example, the optical fiber fixing device 11 employs, as the fixing mechanism, the direct acting mechanism 22, the stopper mechanism 23, the pinion gear 26 and the motor 29. Therefore, reductions in manufacturing cost and maintenance cost are realized by this simplified fixing mechanism.

Further, due to an ability of the clamp arm 21 guided by the direct acting mechanism 22 and the stopper mechanism 23 to move downward along the Z-axis, the clamp portion 19 also moves downward along the Z-axis. Accordingly, since the clamp portion 19 easily moves in a desired direction, no unevenness results in a force required for pressing the optical fiber 13 against the V-grooved block 15.

Still further, the controller 37 is operative to control the rotating speed of the motor 29 and to increase the lowering speed of the stopper mechanism 23 for each re-operation. Consequently, in a case where the optical fiber 13 is thick (i.e., with a large number of core wires), the clamp portion 19 can be lowered at a higher speed than that at which the clamp portion 19 is lowered in a case where the optical fiber 13 is thin (i.e., with a small number of core wires).

Additionally, since the operator section 33 automatically confirms the fixed status of the optical fiber 13 using the TV camera 31, it takes no time for confirmation of the fixed status.

Even further, due to an ability of the controller 37 to control the rotational direction of the output shaft of the motor 29, the clamp portion 19 is vertically shifted, resulting in a capability of automatically correcting the fixed status of the optical fiber 13 any number of times.

FIG. 6 is a flowchart showing a modified form of the method of controlling the optical fiber fixing device 11. In this modified form, the control method additionally includes a step, to be executed by the operator section 33 between steps S10 and S11, of determining whether the optical fiber needs to be correctly placed in the V-groove 15a again or not, based on a placement status of the optical fiber.

Upon receipt of the detection signal, the controller 37 interrupts the drive of the motor 29 and concurrently outputs a placement confirming signal to the operator section 33 (step S12). Upon receipt of the placement confirming signal, the operator section 33 confirms the placement status of the optical fiber 13 and determines whether the optical fiber 13 needs to be correctly placed in the V-groove 15a again or not (step S13). In particular, the operator section 33 receives the placement status of the optical fiber 13 as image data from the TV camera 31. Then, the operator section 33 carries out image processing of the received image data and determines whether the optical fiber 13 needs to be correctly placed in the V-groove 15a again or not. If it is determined that there is no need for correctly placing the optical fiber 13 in the V-groove 15a again, the operator section 33 outputs a continuous signal to the controller 37 (step S14). Subsequently, operation proceeds to step S11 in FIG. 5. If it is determined that there is a need for correctly fixing the optical fiber 13 in the V-groove 15a again, the operator section 33 causes the monitor 35 to display, for example, "RE-PLACE-MENT" (step S15). Thereafter, operation is routed back to a stage in front of step S1 in FIG. 5. More particularly, upon confirmation by an operator for displayed "RE-PLACE-MENT" on monitor 35, the operator opens the lid portion and correctly places the optical fiber 13 on the V-groove 15a again. Then, upon operation of the operator to close the upper end opening of the main body portion using the lid portion, in response to interlocking movement accompanied by such closing operation, the clamp arm 21 is guided by the direct acting mechanism 22 and lowered.

According to this modified form, the optical fiber fixing device 11 has many advantageous features. For example, since the operator section 33 automatically confirms the placement status of the optical fiber 13 using the TV camera 31, it takes no time for placement confirmation.

Here, the structure of the above embodiment is comprised of the stopper mechanism 23 and the motor 29. Free design can be achieved for the stopper mechanism 23 in terms of a shape and material thereof depending on requirements of the device. The stopper mechanism 23 can also be designed to provide a structure that is hard to be mechanically damaged. For example, provision of a resilient member placed on the bottom surface of the groove portion 24a of the guide member 24 allows an impact occurring between the acting portion 21a of the clamp arm 21 and the stopper mechanism 23 to be alleviated. Moreover, it is possible to additionally provide the function of the clamp mechanism 17 to a component part other than the presently filed embodiment.

Second Exemplary Embodiment

In the second exemplary embodiment, component parts similar to those of the first exemplary embodiment bear the same reference numerals for description. An optical fiber fixing device of the second exemplary embodiment is mounted on a fusion splicing apparatus that allows two multi-core fibers to be fusion spliced. Before cut face ends of the two multi-core fibers are mutually abutted and then fusion spliced, the respective multi-core fibers are fixed on a V-grooved block by the optical fiber fixing device.

As shown in FIG. 7, the optical fiber fixing device 41 is comprised of a direct acting mechanism 22, a clamp mechanism 17, a sensor 27, a motor 29, a TV camera 31, an operator section 33, a controller 37, a stopper mechanism 43 and a V-grooved block 45.

The V-grooved block 45 has a plurality of V-grooves 45a on a top surface thereof. A multi-core fiber 47 is placed on the V-grooves 45a. The clamp mechanism 17 serves to hold the multi-core fiber 47 on the V-grooved block 45 and is comprised of the clamp portion 19 and the clamp arm 21. The clamp portion 19, the clamp arm 21 and the direct acting mechanism 22 have the same structures and arrangements as those of the first embodiment, respectively.

The stopper mechanism 43 includes a guide member 44 and the rack 25. The guide member 44 is located on a +X side of the V-grooved block 45 along the Z-axis. Formed on an upper area of the guide member 44 along the Y-axis is a groove portion 44b into which the acting portion 21b of the clamp arm 21 is inserted. The rack 25 is integrally formed on the guide member 44 along the Z-axis on the −Y side of the guide member 44.

The motor 29 is located on the −Y side of the stopper mechanism 43. The pinion gear 26 is fixedly secured to the output shaft of the motor 29. The pinion gear 26 is located on the −Y side of the stopper mechanism 43 along the Z-axis. With such a structure, the pinion gear 26 is in mesh with the rack 25. Accordingly, if the output shaft rotates in a clockwise direction or a counterclockwise direction based on the driving of the motor 29, the stopper mechanism 43 is moved upward or downward via the pinion gear 26. Also, at the initial position of the stopper mechanism 43, the pinion gear 26 meshes with the rack 25 at the lowest end thereof (see FIG. 7).

Integrally formed on an upper area and a −X side of the guide member 44 is a fiber guide 44a that guides the multi-core fiber 47 to the V-groove 45a. The fiber guide 44a is formed in an L-shape and disposed on the +X side of the V-grooved block 45. The fiber guide 44a is placed at a position not to interfere with the clamp portion 19 and the multi-core fiber 47.

Upon sequential operation accompanied by action to close the upper opening of the body section (not shown) using the lid portion (not shown) of the optical fiber fixing device 41, the clamp arm 21 is guided by the direct acting mechanism 22 to move downward. Downward movement of the clamp arm 21 causes the acting portion 21b of the clamp arm 21 to be inserted into the groove portion 44b of the guide member 44. Under such a condition, the clamp portion 19 remains upward of the V-grooved block 45 (see FIG. 7). Thereafter, if the motor 29 is driven to downwardly move the stopper mechanism 43, the clamp arm 21 progressively moves downward while causing the clamp portion 19 to press the multi-core fiber 47 against the V-groove 45a (see FIG. 8). This allows the multi-core fiber 47 to be fixed in place between the V-grooved block 45 and the clamp portion 19.

The sensor 27 includes the magnet sensor and, in an initial position of the stopper mechanism 23, is disposed in a position in close proximity to a bottom surface of the groove portion 44b of the guide member 44 on the −Y side of the guide member 44. The sensor 27 serves to determine whether the acting portion 21b of the clamp arm 21 is brought into contact with the bottom surface of the groove portion 44b of the guide member 44 or not. Due to the presence of the magnet 21c mounted to the lower end face of the acting portion 21b, if the acting portion 21b is moved closer to the bottom surface of the groove portion 44b of the guide member 44 at the initial position of the stopper mechanism 43, the sensor 27 detects the presence of the magnet 21c, thereby outputting a detection signal to the controller 37. Also, the sensor 27 may be disposed in any position provided that such a position is effective to allow the sensor 27 to determine whether the acting portion 21b of the clamp arm 21 is brought into contact with the bottom surface of the groove portion 44b of the guide member 44 or not. For instance, the sensor 27 may be disposed in an area close proximity to the bottom surface of the groove portion 44b of the guide member 44 on the +Y-side of the guide member 44. The TV camera 31, the operator section 33 and the controller 37 are arranged to have the same placements and functions as those of the first exemplary embodiment. Also, control of the optical fiber fixing device 41 is executed in the methods represented in FIGS. 5 and 6.

The optical fiber fixing device 41 constructed according to the second exemplary embodiment has many advantageous features. For example, the optical fiber fixing device 41 employs, as the fixing mechanism, the direct acting mechanism 22, the stopper mechanism 43, the pinion gear 26 and the motor 29. Therefore, reductions in manufacturing cost and maintenance cost are realized by this simplified fixing mechanism.

Further, the clamp arm 21 is guided by the direct acting mechanism 22 and the stopper mechanism 43 to be lowered along the Z-axis, thereby permitting the clamp portion 19 to move downward along the Z-axis. Consequently, since the clamp portion 19 is easily shifted in a desired direction, no unevenness occurs in a force required for pressing the multi-core fiber 47 against the V-grooved block 45.

Still further, the controller 37 is operative to control the rotating speed of the motor 29 such that the lowering speed of the stopper mechanism 43 is increased for each re-operation. Accordingly, in a case where each optical fiber of the multi-core fiber 47 is thick (i.e., with a large number of core wires), the clamp portion 19 can be lowered at a higher speed than that at which the clamp portion 19 is lowered in a case where each optical fiber of the multi-core fiber 47 is thin (i.e., with a small number of core wires). Further, when the optical fiber has an increased number of core wires, the clamp portion 19 can be lowered at a higher speed than that when the optical fiber has a small number of core wires. In general, the larger the number of core wires of the optical fiber, the stronger the repulsion force generated by the multi-core fiber 47 to urge the clamp portion 19 upward will be. For this reason, if the clamp portion 19 is lowered at a low speed, due to sliding frictional force of the clamp 21, the clamp arm 21 stops before the clamp portion 19 presses the multi-core fiber 47.

Additionally, since the operator section 33 automatically confirms the fixed status of the optical fiber using the TV camera 31, it takes no time for placement confirmation work and confirmation work of the fixed status.

Even further, due to an ability of the clamp portion 19 moving upward or downward along the Z-axis through control of the rotational direction of the output shaft of the motor 29, it is possible to repeatedly and correctly fix the multi-core fiber 47 any number of times in an automatic fashion.

Also, since the guide member 44 is formed with the fiber guide 44a, the multi-core fiber 47 can be placed in the V-groove 45a in a reliable and easy fashion.

Here, a structure of the second exemplary embodiment is comprised of the stopper mechanism 43 and the motor 29. Free design can be achieved for the stopper mechanism 43 in terms of a shape and material thereof depending on requirement of the device. The stopper mechanism 43 can be designed to provide a structure that is hard to mechanically damage. For example, provision of a resilient member placed on the bottom surface of the groove portion 44b of the guide member 44 allows an impact occurring between the acting portion 21a of the clamp arm 21 and the stopper mechanism 43 to be alleviated. Moreover, it is possible to additionally provide the function of the clamp mechanism 17 to a component part other than the presently filed embodiment.

Also, the present invention is not limited to the exemplary embodiments described above, and various modifications may be made. For example, the first exemplary embodiment (or the second exemplary embodiment) has been described in conjunction with an example where the clamp portion 19 and the clamp arm 21 of the clamp mechanism 17 are vertically moved as the fixing member that allows the optical fiber 13 (or the multi-core optical fibers 47) to be pressed against the V-grooved block 45. However, the present invention is not limited to such a structure and, for example, may provide a structure to allow the clamp portion and the clamp arm of the clamp mechanism to be horizontally moved. That is, various alterations may be made such that the clamp mechanism is moved in a direction to allow the optical fiber (or the multi-core optical fibers) to be fixed. Moreover, similar alterations may be possibly made in the stopper mechanisms 23, 43.

In other words, while the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical fiber fixing device, comprising:
    a fixing member fixing an optical fiber in a positioning groove;
    a stopper section retaining the fixing member before the fixing member is brought into contact with the optical fiber;
    a driver section moving the fixing member in a first direction via the stopper section; and
    a controller controlling the driver section to adjust a moving speed of the fixing member.

2. The optical fiber fixing device according to claim 1, wherein the fixing member vertically moves relative to the positioning groove in conjunction with movement of the stopper section.

3. The optical fiber fixing device according to claim 1, wherein the controller adjusts the moving speed according to a thickness of the optical fiber.

4. The optical fiber fixing device according to claim 1, wherein the fixing member comprises: a clamp portion pressing the optical fiber against the positioning groove; and a clamp arm comprising a transfer portion with a first end connected to the clamp portion, and an acting portion with a first end integrally connected to a center of the transfer portion.

5. The optical fiber fixing device according to claim 1, wherein the fixing member has a "T" shaped cross-section.

6. The optical fiber fixing device according to claim 4, wherein: the fixing member has a "T" shaped cross-section; the acting portion is the base of the "T"; and the transfer portion is the top of the "T".

7. The optical fiber fixing device according to claim 4, wherein the stopper section comprises: a guide member retaining a second end of the acting portion of the clamp arm opposite the first end; and a rack integrally formed with the guide member.

8. The optical fiber fixing device according to claim 7, wherein the guide member retains the second end of the acting portion within a groove.

9. The optical fiber fixing device according to claim 7, wherein the stopper section further comprises: a fiber guide arranged to guide the optical fiber into the positioning groove.

10. The optical fiber fixing device according to claim 7, wherein the driver section comprises: a motor generating a drive power in response to a command from the controller; and a pinion gear fixedly secured to an output shaft of the motor, wherein, when the motor is driven, the pinion gear and the rack mesh with one another to move the guide member in the first direction.

11. The optical fiber fixing device according to claim 1, further comprising: a sensor connected to the controller and determining whether the fixing member is retained by the stopper section or not.

12. The optical fiber fixing device according to claim 11, wherein the sensor detects a magnet mounted to the fixing member.

13. The optical fiber fixing device according to claim 1, further comprising: an image pickup section for obtaining an image of the optical fiber; and an operator section, connected to the image pickup section and the controller, and determining whether the optical fiber is fixed in place between the fixing member and the positioning groove with no gap.

14. The optical fiber fixing device according to claim 13, wherein, when the operator section determines that the optical fiber is not fixed in place between the fixing member and the positioning groove with no gap, the operator section outputs a signal to the controller to move the fixing member away from the optical fiber via the stopper section.

15. The optical fiber fixing device according to claim 14, wherein, after the fixing member has been moved away from the optical fiber, the controller moves the fixing member toward the optical fiber at a higher speed than that attained in a preceding operation via the stopper section subsequent to the stopper section being separated from the optical fiber.

16. The optical fiber fixing device according to claim 14, wherein the operator section determines whether the optical fiber is correctly placed in the positioning groove through execution of image processing subsequent to the stopper section being separated from the optical fiber.

17. The optical fiber fixing device according to claim 16, wherein, when the operator section determines that the optical fiber is not correctly placed in the positioning groove, the operator section provides an operator with a notification.

18. The optical fiber fixing device according to claim 1 wherein the positioning groove comprises multiple grooves.

19. An optical fiber fixing device, comprising:
fixing means for fixing an optical fiber in a positioning groove;
stopper means for retaining the fixing means before the fixing means is brought into contact with the optical fiber;
driver means for moving the fixing means in a first direction via the stopper means; and
controller means for controlling the driver means to adjust a moving speed of the fixing means.

20. An optical fiber fixing device, comprising:
a fixing member comprising a bottom surface;
a block comprising a positioning groove arranged on a top surface opposing the bottom surface of the fixing member;
a stopper mechanism supporting the fixing member;
a motor directly operatively connected to the stopper mechanism to move the stopper mechanism and the fixing member.

21. The optical fiber fixing device according to claim 20, further comprising a controller electrically connected to the motor to vary the speed of the motor.

22. The optical fiber fixing device according to claim 21, further comprising a camera electrically connected to the controller and arranged to provide video feedback regarding the position of the optical fiber within the positioning groove.

23. The optical fiber fixing device according to claim 22, further comprising an operator section comprising an image processor that determines the position of the optical fiber based upon the video feedback from the camera.

24. The optical fiber fixing device according to claim 23, wherein the operator section comprises a monitor that outputs the video feedback obtained by the camera so that it may be viewed by an operator.

25. The optical fiber fixing device according to claim 20, wherein the fixing member comprises: a clamp portion providing the first surface of the fixing member; and a clamp arm, wherein the clamp arm comprises a transfer portion connected to the clamp portion and an acting portion connected to the stopper mechanism.

26. The optical fiber fixing device according to claim 25, wherein the clamp arm is formed into a "T" shaped cross-section.

27. The optical fiber fixing device according to claim 26, wherein the base portion of the "T" shaped cross-section of the clamp arm comprises an acting portion, and is inserted into a groove portion of the stopper mechanism.

28. The optical fiber fixing device according to claim 20, wherein the fixing member comprises a magnet.

29. The optical fiber fixing device according to claim 28, wherein the stopper mechanism comprises a magnetic sensor to determine the position of the magnet arranged on the fixing member.

30. The optical fiber fixing device according to claim 20, wherein the stopper mechanism comprises a rack directly connected to a pinion gear of the motor to move the stopper mechanism.

31. The optical fiber fixing device according to claim 20, wherein the block comprises a plurality of positioning grooves provided for multi-core optical fibers.

32. A method of fixing an optical fiber comprising the steps of:
arranging an optical fiber in a positioning groove;
moving a fixing member to the optical fiber;
retaining the fixing member using a stopper section before the fixing member is brought into contact with the optical fiber; and
controlling a moving speed of the fixing member and fixing the optical fiber via the stopper section.

33. The method of fixing an optical fiber according to claim 32, further comprising the step of determining a thickness of the optical fiber, wherein, in the step of controlling a moving speed of the fixing member, the moving speed is determined based upon the thickness of the optical fiber.

34. The method of fixing an optical fiber according to claim 32, further comprising the step of determining if the fixing member is retained by the stopper section.

35. The method of fixing an optical fiber according to claim 32, further comprising the step of determining whether the optical fiber is fixed in place between the fixing means and the positioning groove with no gap.

36. The method of fixing an optical fiber according to claim 35, wherein, if it is determined that the optical fiber is not fixed in place between the fixing means and the positioning groove with no gap, the fixing member is moved away from the optical fiber.

37. The method of fixing an optical fiber according to claim 36, wherein, after the fixing member has been moved away from the optical fiber, the fixing member is moved toward the optical fiber at a higher speed than that of the preceding movement of the fixing member towards the optical fiber.

38. The method of fixing an optical fiber according to claim 35, further comprising the step of notifying an operator if it is determined that the optical fiber is not correctly placed in the positioning groove.

* * * * *